UNITED STATES PATENT OFFICE.

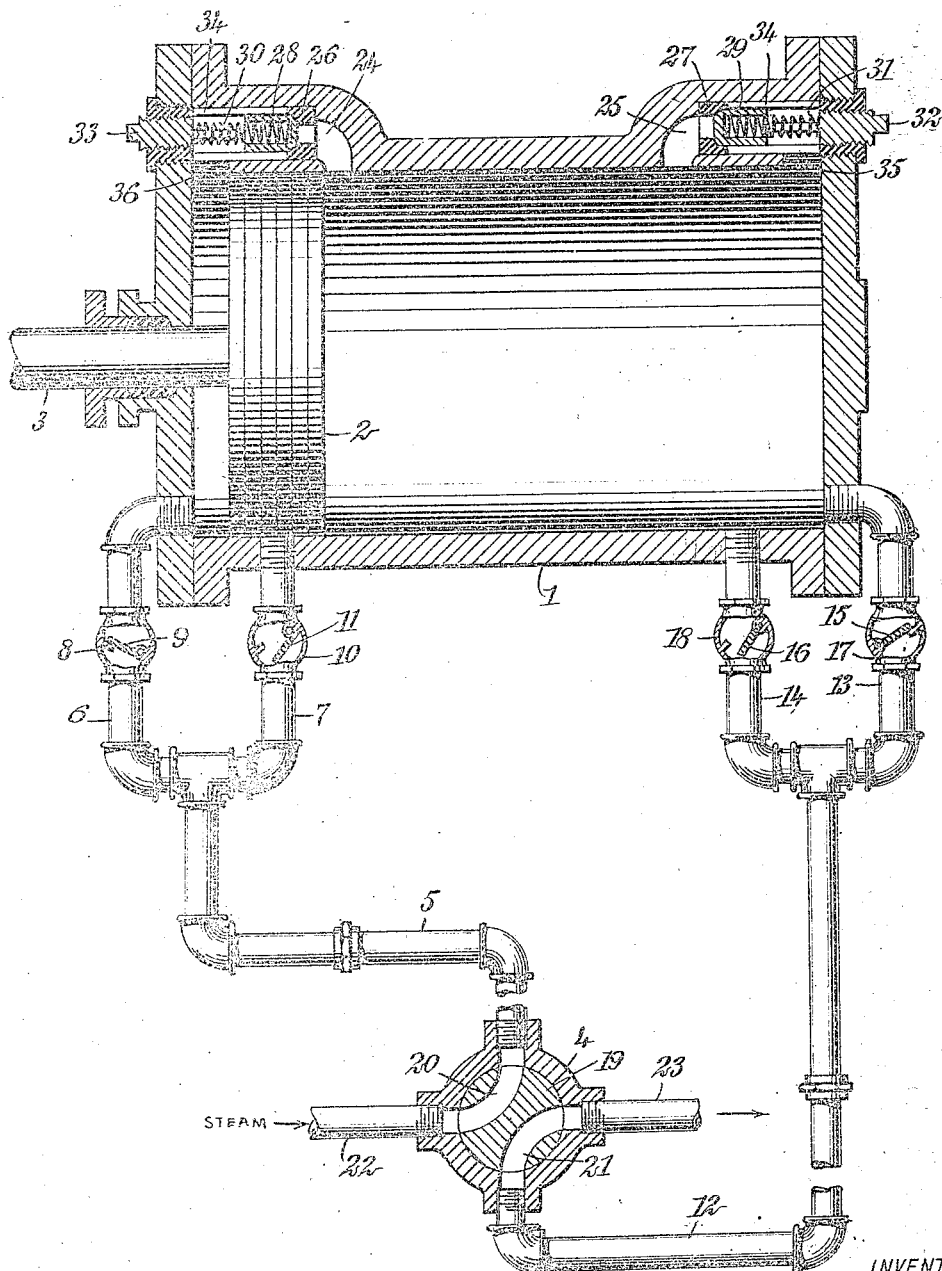

ERNEST C. THORSCHMIDT, OF NEW YORK, N. Y.

AUTOMATIC STOP FOR PISTONS.

No. 855,266.     Specification of Letters Patent.     Patented May 28, 1907.

Application filed June 5, 1906. Serial No. 320,291.

*To all whom it may concern:*

Be it known that I, ERNEST C. THORSCHMIDT, a citizen of the United States, and a resident of the city of New York, borough of Brooklyn, in the county of Kings and State of New York, have invented a new and Improved Automatic Stop for Pistons, of which the following is a full, clear, and exact description.

This invention relates to improvements in automatic stops for pistons actuated by steam or water pressure, the invention being particularly adapted for use in connection with power hammers; the object being to provide a simple means to cushion a piston when near the end of its stroke.

I will now describe an automatic stop for pistons, embodying my invention, and then point out the novel features in the appended claims.

Reference is to be had to the accompanying drawing forming a part of this specification, in which the figure is a sectional view of an engine with an automatic stop embodying my invention.

Referring to the drawing, 1 designates a cylinder, and 2 a piston operating therein, the rod 3 of which may connect with a hammer or other suitable device. From a valve casing 4, a pipe 5 leads to connection with branch pipes 6, 7, the said branch 6 leading through one of the cylinder heads to serve as the inlet pipe for the motive agent; and the other branch 7, leads through the cylinder wall inward of the head as clearly indicated. The branch 6 is provided with a valve casing 8 in which is an inwardly opening check valve 9; and the branch 7 also is provided with a valve casing 10 in which is arranged an outwardly opening check valve 11. Also leading from the valve casing 4 is a pipe 12 communicating with a steam inlet branch pipe 13 and an exhaust branch pipe 14. These branches are arranged of course, at the opposite end of the cylinder to the branches first described, and the branch 13 leads through the cylinder head while the branch 14 passes through the cylinder body inward of the head. The branch 13 is provided with an inwardly opening check valve 15 while the branch 14 has an outwardly opening check valve 16, these valves being arranged respectively in casings 17, 18. Within the valve casing 4 is a rotary valve 19 which when the motive agent is to be used for the purpose above described, is to be turned manually; and this valve is provided with ports 20, 21, whereby live steam or other motive agent passing into the casing through the supply pipe 22 may be directed into the pipe 5, and thence through the branch 6 to actuate the piston; and when the port 20 is in such position as indicated in the drawing, the port 21 will be placed in communication with the pipe 12 and the exhaust pipe 23. For reversing the motion of the piston of course, the valve 19 is to be turned to place the pipes 22 and 12 in communication, for the passage of the actuating agent and to place the pipes 5 and 23 in connection for an exhaust.

Arranged in the wall of the cylinder at its opposite ends are equalizing ports 24, 25, arranged at the ends of which are valve seats 26, 27, for the valves 28, 29, these valves being pressed toward their seats by means of springs 30, 31, extended from plugs 32, 33, engaging in suitable bushings in the cylinder heads.

The valve seats here shown are connected to rods 34 the outer ends being connected to the plugs, thus practically forming skeleton casings for the valves, and from these casings the motive agent passes to the interior of the cylinder through the ports 35 or 36, formed through the wall of the cylinder at its ends.

In the operation, assuming the piston to be at the end indicated in the drawing, when the motive agent is turned on, the pressure will close the valve 11 and open the valve 9 permitting the motive agent to pass into the cylinder to the piston, a portion of the pressure will engage with the valve 28, closing it on its seat and upon the piston nearly reaching its complete stroke, the pressure at the rear side thereof will pass through the port 25 and open the valve 29 so that a cushioning will take place at the opposite side of the piston. When the piston covers or passes over the exhaust pipe or branch as above mentioned, the cushioning pressure will cause the valve 29 to engage with its seat.

It will be noted that both the pipes 5 and 12 act alternately for inlet and exhaust.

Having thus described my invention I claim as new, and desire to secure by Letters Patent:—

In a mechanism for the purpose specified, a cylinder, a piston in the cylinder, equalizing ports in the wall of the cylinder near the ends, valves for controlling said ports, a pipe having a supply branch leading through one end of the cylinder, an inwardly opening valve therein, an exhaust branch connecting with said pipe, an outwardly opening valve in the exhaust branch, a second pipe having a supply branch leading through the piston end of the cylinder, an inwardly opening valve in said branch, an exhaust branch communicating with said second pipe, and an outwardly opening valve in said last-named exhaust branch.

In testimony whereof I have signed my name to this specification in the presence of two subscribing witnesses.

ERNEST C. THORSCHMIDT.

Witnesses:
   E. C. NIELSON,
   C. R. FERGUSON.